A. B. LITTLE.
COTTON BALING APPARATUS.
APPLICATION FILED JUNE 9, 1919.
1,437,530.
Patented Dec. 5, 1922.
2 SHEETS—SHEET 1.
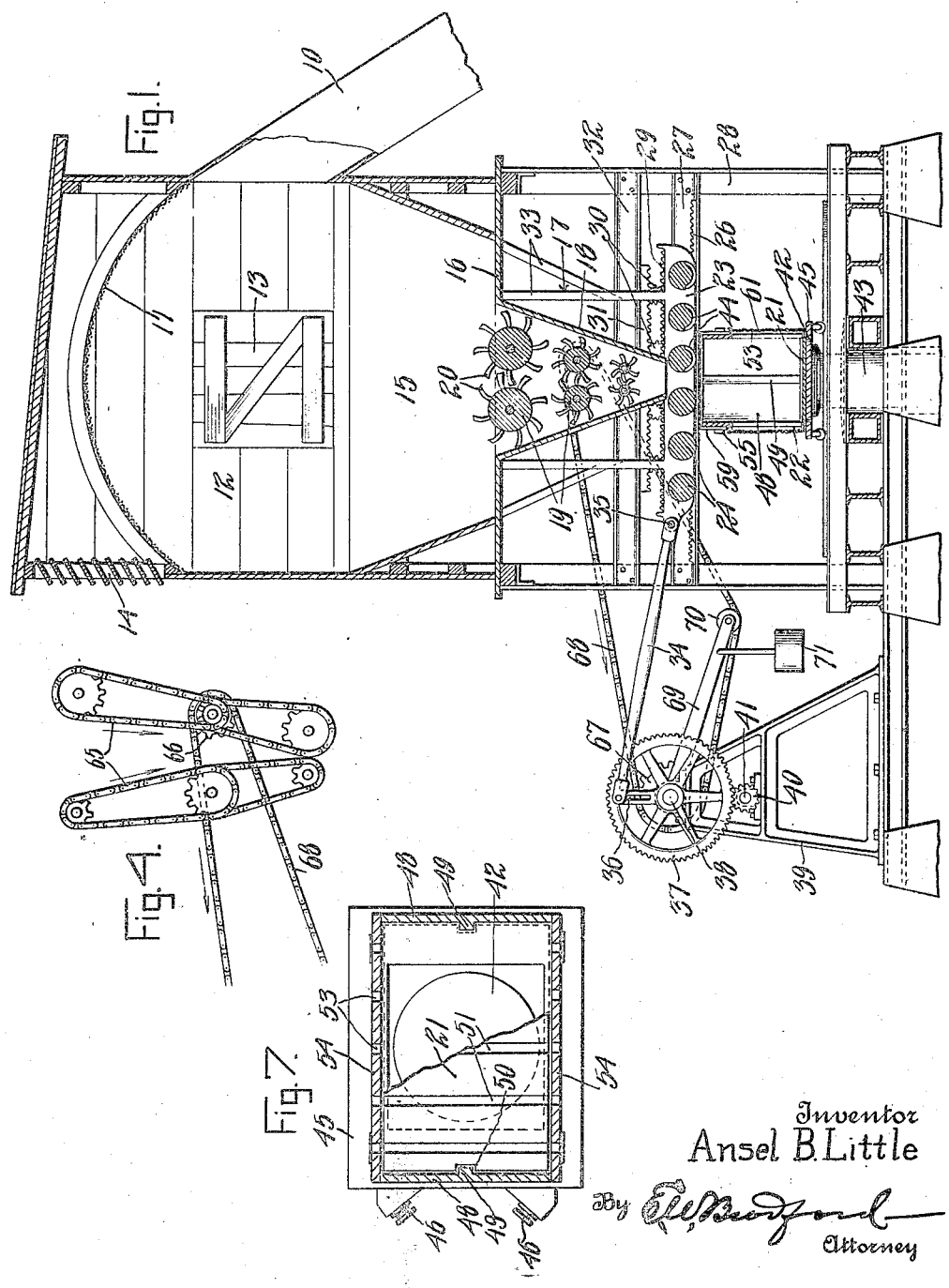
Inventor
Ansel B. Little

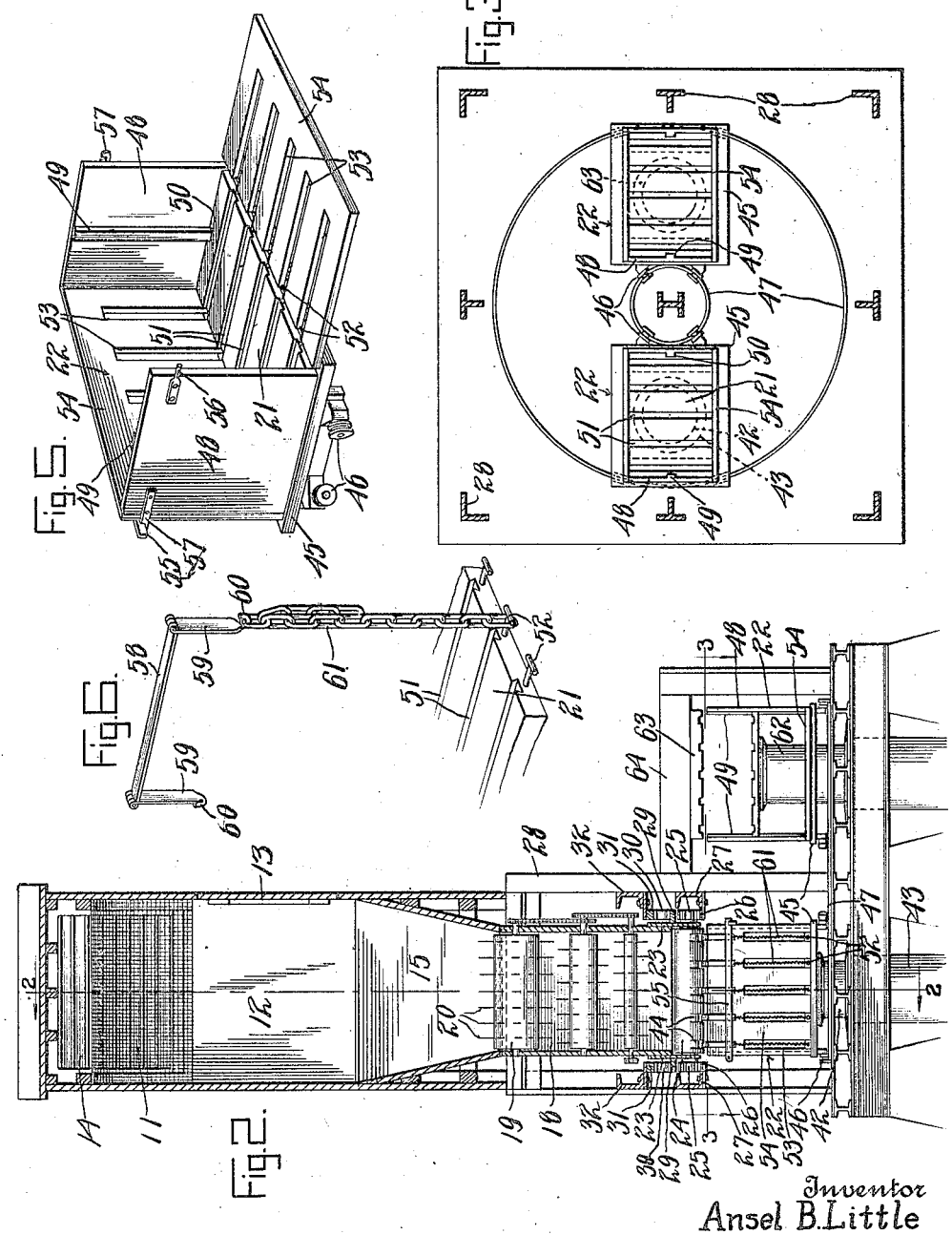

Patented Dec. 5, 1922.

1,437,530

UNITED STATES PATENT OFFICE.

ANSEL BLAKE LITTLE, OF ATLANTA, GEORGIA.

COTTON-BALING APPARATUS.

Application filed June 9, 1919. Serial No. 302,802.

*To all whom it may concern:*

Be it known that I, ANSEL BLAKE LITTLE, a citizen of the United States, residing at Atlanta, in the county of Fulton and State of Georgia, have invented certain new and useful Improvements in Cotton-Baling Apparatus, of which the following is a specification.

My said invention relates to cotton baling presses and consists of an apparatus that collects the lint from the gins, forms it into a bat, deposits the bat in a press where it is formed into a bale of moderate density, then transfers the bale thus formed to another press for giving it the required high density, all as will be hereinafter more fully described and claimed.

Referring to the accompanying drawings which are made a part hereof, and on which similar reference characters designate similar parts, Figure 1 is a vertical sectional view through the entire apparatus, on line 2—2 of Figure 2.

Figure 2, a vertical sectional view at right angles to that in Figure 1.

Figure 3, a horizontal sectional view as taken on the dotted line 3—3 in Figure 2, Figure 4, a detail view showing the arrangement for driving the series of combing cylinders, Figure 5, a detail perspective of one of the receptacles used to transfer the bale from the low density compress to the high density compress, Figure 6 is a detail perspective of one of a series of clutches used during the transferring operation, and Figure 7 is a plan of a bale box with part of the bottom broken away to show a piston for operating its platen.

In said drawings, the portion marked 10 represents a chute which leads from any suitable form of gin and through which the lint is forced by means of a current of air common to all gins. After leaving the end of the chute, the lint is caught by a curved screen 11 formed in the top of a compartment 12 which is provided with a door 13 through which access may be had for cleaning purposes. Formed in one side of the compartment 12 above the screen 11 is an outlet 14 through which the air passes after having passed through the screen. The sides of the compartment 12 form a hopper 15 which is closed by means of a sliding floor 16 carried by a reciprocating frame 17. The center of the floor 16 is open and communicates with the upper end of a hopper 18 in which is mounted a series of pairs of combing cylinders 19 having teeth 20 which collect the lint, comb it and pass it out of the lower end of the hopper 18 in the form of a "bat" and deposit it on a platen 21 forming the floor of a portable receptacle 22. These cylinders 19 are mounted in pairs with their adjacent surfaces travelling in the same direction but at different speeds and are driven by suitable chain gearing shown in Figure 4. The shaft of one intermediate roller carries a sprocket 66 which is connected to a sprocket 67 keyed to a shaft 38 by means of a chain 68 while the lowermost cylinders are geared together by a gear and pinion to afford a driving means for all of the cylinders. As the frame carrying the several cylinders reciprocates and the shaft 38 remains stationary, I have provided means to keep the chain 68 taut, consisting of an arm 69 having a bearing on the shaft 38 and having a grooved roller 70 running on the chain 68. Tension is applied to the arm 69 by means of a suitable weight 71. The frame 17 consists of side members 23 in which are journalled a series of rollers 24 having pinions 25 which travel upon rack-bars 26 mounted upon beams 27 forming a part of the main framework 28 of the apparatus. The side members 23 carry rack-bars 29 upon which travel a series of pinions 30 which are in mesh with a stationary rack-bar 31 carried by a beam 32 secured to the frame 28. Uprights and braces 33 extend upwards from the members 23 and support the floor 16. A pitman 34 is connected to one end of the members 23 by a shaft 35 and at its opposite end is adjustably mounted in a crank-slot 36 formed in a gear 37 mounted on a shaft 38 carried by a suitable frame 39, to secure the length of throw desired. The gear 37 is rotated at a moderate speed by means of a pinion 40 located on the end of a shaft 41 driven by any suitable power. It will readily be seen that the frame 17 and its component parts will be reciprocated thereby, the length of the movement depending upon the adjustment of connection between pitman 34 and crank-slot 36, depositing the continuous bat of lint upon the platen 21 in layers one upon another which are constantly held against the under side of the rollers 24 by means of piston 42 of a hydraulic cylinder 43 located beneath the platen 21 and controlled by any suitable means so that its normal position will be at the top of the press-box when the operation begins and will recede toward the bottom gradually as the operation proceeds, until the box is crowded full and a bale of moderate density formed. Grooves 44 are formed in certain of the rollers 24 for a purpose to be explained later.

The receptacle 22 comprises a frame 45 beneath which are mounted flanged wheels 46 designed to run on a pair of circular rails 47. Upstanding stationary end members 48 are secured to the frame 45 and have guide ribs 49 on their inner faces which fit in notches 50 formed in the ends of the platen 21 and guide the same in its movements. The platen 21 is provided with the usual grooves 51 and with a series of projecting arms 52 which pass through slots 53 formed in side doors 54 which are hinged at their lower edge to the frame 45 and which are retained in their closed or upright position by bars 55 pivoted at one end on one end member 48 and engaged in hooks 57 on the other member 48 as shown in Figures 1 and 5. When a bale of the desired size has been formed, the frame 17 is stopped with the grooves 44 of the rollers 24 directly over the receptacle 22 and the bat of lint is cut. The pressure exerted by the piston 42 forms the bale against the rollers 24 but the grooves 44 are left clear for the reception of a series of clutches as shown in Figure 6, which consist of a flat bar 58 having short members 59 hinged to its ends and carrying hooks 60. Chains 61 are connected to the hooks 60 and to the arms 52 on the platen 21 to retain the bale in its semi-compressed state. The piston 42 is then lowered (in any usual way) leaving the platen 21 and the bale in the raised position in the receptacle. The receptacle is then transferred upon its wheel to a position directly over a high density press piston 62 which is first raised to support the bale until the clutches are removed, then raised to the limit of its capacity forcing the bale upward against the under side of a stationary platen 63 carried beneath a beam 64 secured in the main frame 28. The customary bale-ties are then applied to the bale and the piston 62 lowered and the bale removed.

By this construction and arrangement the operation of forming lint cotton into bales may be carried on in what is practically a continuous manner, the high density press being operated to re-press the low density bale as it comes from the first operation, and while this operation is being completed another low density bale is being formed by the first press. It will be understood of course that at least two of the receptacles, or bale forming boxes, 22, must be provided for each apparatus and as many more as may be found desirable.

Having thus fully described my said invention, what I claim as new and desire to secure by Letters Patent, is:

1. An apparatus for baling cotton comprising a room for receiving the cotton from the gins under air pressure, a reciprocating floor in said room formed with a hopper-like receptacle in its bottom, a series of pairs of combing rollers in said hopper-like receptacle, a press beneath said hopper-like receptacle, a bale forming box on said press and in position to receive the cotton from said hopper-like receptacle, a series of rollers interposed between the mouth of said hopper-like receptacle and said box between which the bat of cotton formed by said combing rollers is adapted to pass, means for reciprocating said floor, hopper and rollers, and means for operating said press, substantially as set forth.

2. A cotton baling apparatus comprising a room arranged to receive the lint cotton from the gins, a hopper, a series of pairs of combing rolls mounted in said hopper in the bottom of said room, a track, a press beneath the hopper comprising a box and a platen mounted on wheels to run on said track, another press located in the same structure and in position to operate on said platen when the press box is moved on its tracks to bring it into proper position, and means for operating said several parts, substantially as set forth.

3. An apparatus for baling cotton comprising a room for receiving the cotton, a plurality of presses, a reciprocating hopper in the bottom of said room, a series of pairs of combing rolls in said hopper, a plurality of bale forming boxes, a track on which said boxes are mounted adapted to guide them to beneath said hopper and also from one press to another, pressure-applying devices located in a position beneath the hopper and in a position along side the hopper whereby the bale-forming box may be first filled and partly compressed and then transferred to the other press for high density compression, substantially as set forth.

4. In a cotton baling apparatus the combination of a chamber to receive the cotton from the gin, said chamber having an arched screen at the top, bat forming rollers, a hopper-like formation in a lower portion of said receptacle, a bale forming box beneath said hopper and adapted to receive the cotton bat therefrom, a platen in the lower portion of said box, a low density pressure cylinder beneath said platen, a high density pressure cylinder and press separate from said other press, and means for transferring said box from one press to the other, substantially as set forth.

5. In an apparatus for baling cotton the combination of a receptacle for receiving the cotton from the gin, bat forming mechanism in the bottom thereof, two presses, one located beneath said bat forming mechanism and the other to one side thereof, a bale forming box mounted on a track adapted to guide it from the position of one press to the other, a movable platen in the bottom of said box, and means for supporting said movable platen while the box is being moved from one press to the other, substantially as set forth.

6. An apparatus for baling cotton comprising a frame, a plurality of presses mounted in said frame, a track arranged around said presses, a bale forming box mounted on trucks on said track and adapted to be positioned in either of said presses, said bale forming box being formed with a movable platen, means for sustaining said platen in the position to which it is adjusted by the first press while it is being moved from said first press to the second press, and means for depositing the cotton in said bale forming box while in its first position, substantially as set forth.

7. An apparatus for baling cotton comprising a frame, a plurality of presses mounted in said frame, a track for guiding a movable bale forming box from one press to another, said bale forming box having wheels mounted on said track, a platen forming a part of said bale forming box and adapted to be operated by the respective pistons of said presses, and means for operating said several parts, substantially as set forth.

8. An apparatus for baling cotton comprising a frame, a plurality of presses mounted in said frame, a circular track connecting said presses, a plurality of bale forming boxes mounted to move on said track, means for introducing the cotton into the bale forming boxes at one press, and means for compressing the cotton to high density in the second press, substantially as set forth.

9. An apparatus for baling cotton comprising a frame, a plurality of presses mounted in said frame, movable boxes mounted on tracks arranged to guide them from one press to another, means for introducing the cotton into said bale forming boxes at one press, said boxes being formed with central apertures through which the pistons of the presses operate and with sliding platens, and means for sustaining said platens in the position to which they are operated by the first press while the bale forming box is being transferred to the second press, substantially as set forth.

10. In an apparatus for baling cotton or the like, a circular track and baling boxes thereon having a bottom portion, angularly placed rollers near each lower corner thereof to rest on the tracks, a platen forming the floor of the box and side and end members, the platen having guiding means co-acting with guiding means on the side and end members to permit free vertical movement of the platen.

11. In an apparatus for baling cotton, a bale-forming box having a bottom portion with a central opening, a platen forming the floor of the box, fixed end members, side members hinged at their lower edges, connections between the side and end members to hold the side members up, and means on the platen and the box to guide the platen for up and down movement.

12. In a cotton baling apparatus, a bale-forming box, a platen movable up and down in the box, slots in the sides of the box and devices on the platen projecting through the slots, bars adapted to be placed across the box to prevent bulging of the bale therein, and means to connect the ends of the bars to said projecting devices on the platen.

13. An apparatus for baling cotton comprising a frame, a press mounted in said frame, a bale forming box mounted above said press, means for introducing cotton into said bale forming box, a movable platen forming the bottom of said box, and bars arranged to extend across the top of said box and having hooks on their ends and chains attached to the platen whereby said platen may be sustained in position by hooking the links of said chains over said hooks, substantially as set forth.

14. In a cotton baling apparatus, a chamber, an inlet leading thereto directly from a gin, a screen forming part of the upper wall of the chamber, a roller press below the chamber and means for forming a bat and guiding it to the press comprising a reciprocating frame for the rollers of the press, a hopper on the frame and a plurality of series of differentially driven toothed cylinders to comb the cotton, substantially as set forth.

15. In a cotton baling apparatus, a chamber, a conduit for cotton leading from a gin directly to the chamber, a screen forming part of the wall of the chamber, a press beneath the chamber, and means to form the cotton into a bat and guide it to the press comprising a hopper and combing devices in the hopper, substantially as set forth.

16. In a cotton baling apparatus, a chamber, a conduit for cotton leading from a gin directly to the chamber, a screen forming part of the wall of the chamber, a press beneath the chamber, and means to form the cotton into a bat and guide it to the press comprising a reciprocating frame, a hopper on the frame, and means in the hopper for combing the cotton, substantially as set forth.

17. An apparatus for baling cotton comprising a chamber having an inlet passage for lint cotton, an arched screen at the top of the chamber to collect the cotton, a hopper to form the cotton into a bat, combing devices in the hopper and a press below the hopper.

18. In an apparatus for baling cotton, means for forming a bat comprising a hopper to receive lint cotton, and a plurality of pairs of cylinders having teeth for combing the cotton, the teeth extending substantially to the sides of the hopper and the cylinders decreasing in size toward the bottom of the hopper.

19. In an apparatus for baling cotton, a hopper, and a plurality of superposed pairs of combing cylinders therein to act successively on the cotton for combing it.

In witness whereof, I have hereunto set my hand and seal at Atlanta, Georgia, this 7th day of June, A. D. nineteen hundred and nineteen.

ANSEL BLAKE LITTLE. [L. S.]

Witnesses:
K. L. BOONE,
E. J. PETERSON.